(12) United States Patent
Kim et al.

(10) Patent No.: US 8,942,420 B2
(45) Date of Patent: Jan. 27, 2015

(54) DETECTING EMBOSSED CHARACTERS ON FORM FACTOR

(71) Applicant: QUALCOMM Incorporated, San Diego, CA (US)

(72) Inventors: Duck Hoon Kim, Seoul (KR); Young-Ki Baik, Seoul (KR); Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/654,748

(22) Filed: Oct. 18, 2012

(65) Prior Publication Data

US 2014/0112526 A1    Apr. 24, 2014

(51) Int. Cl.
*G06K 9/00*    (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 5,177,793 A * | 1/1993 | Murai et al. ................... | 382/219 |
| 6,628,808 B1 | 9/2003 | Bach et al. | |
| 7,802,720 B2 | 9/2010 | Yang | |
| 2003/0133612 A1 * | 7/2003 | Fan ............................... | 382/199 |
| 2006/0008147 A1 * | 1/2006 | Jung et al. ...................... | 382/176 |
| 2007/0263930 A1 * | 11/2007 | Ito ................................. | 382/177 |
| 2009/0177579 A1 * | 7/2009 | Ling .............................. | 705/39 |
| 2009/0285459 A1 * | 11/2009 | Aggarwal et al. ............. | 382/125 |
| 2009/0327131 A1 | 12/2009 | Beenau et al. | |
| 2010/0008535 A1 * | 1/2010 | Abulafia et al. ............... | 382/100 |
| 2010/0232697 A1 * | 9/2010 | Mishima et al. .............. | 382/168 |
| 2011/0123120 A1 * | 5/2011 | Quack ........................... | 382/197 |
| 2012/0033874 A1 * | 2/2012 | Perronnin et al. ............. | 382/159 |
| 2013/0128051 A1 * | 5/2013 | Velipasalar et al. ........... | 348/158 |

FOREIGN PATENT DOCUMENTS

WO    2012054148 A1    4/2012
WO    2013118083 A1    8/2013

OTHER PUBLICATIONS

Weinmen et al (Scene Text Recognition using Similarity and a Lexicon with Sparse Belief Propagation, IEEE 2009).*
International Search Report and Written Opinion for International Application No. PCT/US2013/065287, ISA/EPO, Date of Mailing May 19, 2014, 19 pages.

(Continued)

*Primary Examiner* — Amara Abdi
(74) *Attorney, Agent, or Firm* — Toler Law Group, PC

(57) ABSTRACT

A portable computing device reads information embossed on a form factor utilizing a built-in digital camera and determines dissimilarity between each pair of embossed characters to confirm consistency. Techniques comprise capturing an image of a form factor having information embossed thereupon, and detecting embossed characters. The detecting utilizes a gradient image and one or more edge images with a mask corresponding to the regions for which specific information is expected to be found on the form factor. The embossed form factor may be a credit card, and the captured image may comprise an account number and an expiration date embossed upon the credit card. Detecting embossed characters may comprise detecting the account number and the expiration date of the credit card, and/or the detecting may utilize a gradient image and one or more edge images with a mask corresponding to the regions for the account number and expiration date.

54 Claims, 7 Drawing Sheets

(56) References Cited

OTHER PUBLICATIONS

Kincaid, J., "Card.io's SDK Makes Entering Credit Card Information As Easy As Taking a Snapshot," Retrieved from http://techcrunch.com/2011/06/23/card-ios-sdk-makes-entering-credit-card-information-as-easy-as-taking-a-snapshot/ Jun. 23, 2011, 1 page, TechCrunch, AOL, New York, New York.

Minetto, R., et al., "Fuzzy Histogram of Oriented Gradients to Characterize Single Line Text Regions," Technical Report IC-11-10, May 2011, Instituto de Computacao Universidade Estadual De Campinas, Campinas, Brazil, pp. 1-16.

Minetto R., et al., "Text Detection and Recognition in Urban Scenes," 2011 IEEE International Conference on Computer Vision Workshops, Nov. 2011, IEEE, Piscataway, NJ, pp. 227-234.

Partial International Search for International Application No. PCT/US2013/065287, mailed Feb. 5, 2014, 7 pages.

Weinman J., et al., "Scene Text Recognition Using Similarity and a Lexicon with Sparse Belief Propagation", IEEE Transactions on Pattern Analysis and Machine Intelligence, IEEE Computer Society, vol. 31, No. 10, Oct. 2009, pp. 1733-1746.

Weinman J.J., et al., "Improving Recognition of Novel Input with Similarity", Proceedings of the 2006 IEEE Computer Society Conference on Computer Vision and Pattern Recognition, (CVPR'06) IEEE Computer Society, Piscataway, NJ, USA, vol. 1, Jun. 2006, pp. 308-315.

* cited by examiner

DETECTING EMBOSSED CHARACTERS ON FORM FACTOR

BACKGROUND

Credit cards (as well as debit cards, gift cards, reward cards, stored value cards, and other embossed form factors) are widely used in transactions, such as financial transactions made between a variety of individuals, businesses, and organizations. For example, credit cards, debit cards, gift cards, reward cards, stored value cards, and other embossed form factors may be used to purchase goods or services, pay for incurred expenses, obtain cash (via a "cash advance"), donate money to charitable organizations, and pay taxes, among other such uses.

These transactions may be conducted using any of several available methods. For example, credit card information is often acquired by "swiping" the credit card at a special credit card terminal that reads information encoded in the magnetic strip on the back of the credit card or that mechanically senses the card information embossed on the surface of the credit card. Credit card information may also be manually entered at a numbered keyboard or keypad, such as when sending credit card information through a telecommunications network such as the Internet to virtual merchants having an online storefront. When credit cards were first introduced, however, manual credit card imprinters were used with carbon-copy purchase slips to record (or "pressure etch") the information embossed on the credit card (that is, the raised numbering and lettering). While electronic credit card processing has substantially reduced the use of manual imprinters, the manual approach still provides a handy backup when electronic processing is not available and, thus, most credit card issuers have continued to emboss processing information on the surface of the credit card.

Credit card transaction entities such as retail businesses and other merchants may encounter various challenges and higher costs in receiving credit card payments. The various payment processors providing credit card services to these transaction entities often charge fees for processing credit card payments on the merchants' behalf, and the fees may vary based on the nature of the transaction. For example, merchants may be charged higher fees for "card-not-present" transactions (e.g., performed by the purchaser manually entering their credit card information at a keyboard or a keypad) than for "card-present" transactions (e.g., physically "swiping" the credit card at a credit card terminal at a local retailer). This is partly because "card-present" transactions are less likely to be fraudulent and can be more readily verified using additional equipment (such as "swipe" credit card terminals), whereas "card-not-present" transactions do not necessarily require the physical presence of a valid credit card but, instead, merely require knowledge of the information pertaining to the card. Therefore, retail brick-and-mortar merchants have a good financial incentive to use credit card terminals in lieu of permitting customers to manually input credit card information, but merchants "in the field" or virtual merchants (i.e., on-line merchants) may not have any practical means to utilize credit card terminals. These shortcomings also seemingly contribute to preventing individuals from receiving personal credit card payments from other individuals because of the lack of clean, easy, "card-present" methods for processing such payments.

One option available to these merchants is to read credit card information using a portable computing device. This approach is typically accomplished utilizing an additional connector to the portable computing device through which a credit card is "swiped" and the information encoded in the credit card's magnetic strip is obtained. However, additional connectors are inconvenient, and embedding credit card swipe devices into portable computing devices is suboptimal because of space requirements and form factor limitations.

SUMMARY

Various implementations disclosed herein are directed to a system that processes a financial transaction involving a card (also referred to as a form factor) with embossed characters and a portable computing device (a.k.a., mobile device) coupled to a transaction processing server. During operation, the system obtains transaction data associated with the financial transaction that includes embossed character information derived from an image of the card. The system then sends the transaction data to the transaction processing server using the portable computing device.

Various implementations disclosed herein are directed to conducting transactions through a portable computing device, wherein the portable computing device comprises an image acquisition unit and a mobile application operated by the portable computing device. The methods may comprise acquiring an image of a card with embossed characters, analyzing data of the image, outputting details of the card from the analysis, and verifying the output details (wherein the verification is carried out by the portable computing device). For several such implementations, the methods may further comprise communicating with a transaction processing server over at least one communication network wherein the communication is carried out by the transaction module using the portable computing device.

Certain implementations comprise a method for a portable computing device to read information embossed on a form factor utilizing a built-in digital camera, the method comprising: capturing an image of a form factor having information embossed thereupon; and detecting embossed characters, wherein the detecting utilizes a gradient image and one or more edge images with a mask corresponding to the regions for which specific information is expected to be found on the form factor. For some such implementations, the embossed form factor may be a credit card, the captured image may comprise an account number and an expiration date embossed upon the credit card, the detecting embossed characters may comprise detecting the account number and the expiration date of the credit card, and the detecting may utilize a gradient image and one or more edge images with a mask corresponding to the regions for the account number and expiration date.

Other implementations comprise a method for a portable computing device utilizing a built-in digital camera to read information from an embossed form factor, the method comprising: capturing an image of the embossed form factor; detecting embossed characters comprising an account number; and determining dissimilarity between each pair of embossed digits to confirm consistency.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

The following description is presented to enable any person skilled in the art to make and use the disclosed implementations, and is provided in the context of a particular application and its requirements. Various modifications to the disclosed implementations will be readily apparent to those skilled in the art, and the general principles defined herein may be applied to other implementations and applications without departing from the spirit and scope of the present description. Thus, the present description is not intended to be limited to the implementations shown, but is to be accorded the widest scope consistent with the principles and features disclosed herein.

The terms embossed form factor, credit card, debit card, gift card, reward card, and stored value card are used herein interchangeably where the use of one such term shall inherently include equivalent use and disclosure including all of the other equivalent terms accordingly.

In general, various implementations disclosed herein provide a method and system for identifying and verifying embossed characters on a form factor such as a credit card. This information may be used to process credit card transactions, for example. As such, several implementations disclosed herein provide a method and system for performing card-present credit card transactions using a portable computing device such as a laptop or notebook computer, smart phone, or mobile phone, for example. For certain implementations, hardware and software components native to the portable computing device may be used to perform card-present transactions by communicating with a transaction processing server or equivalent.

Figure 1:
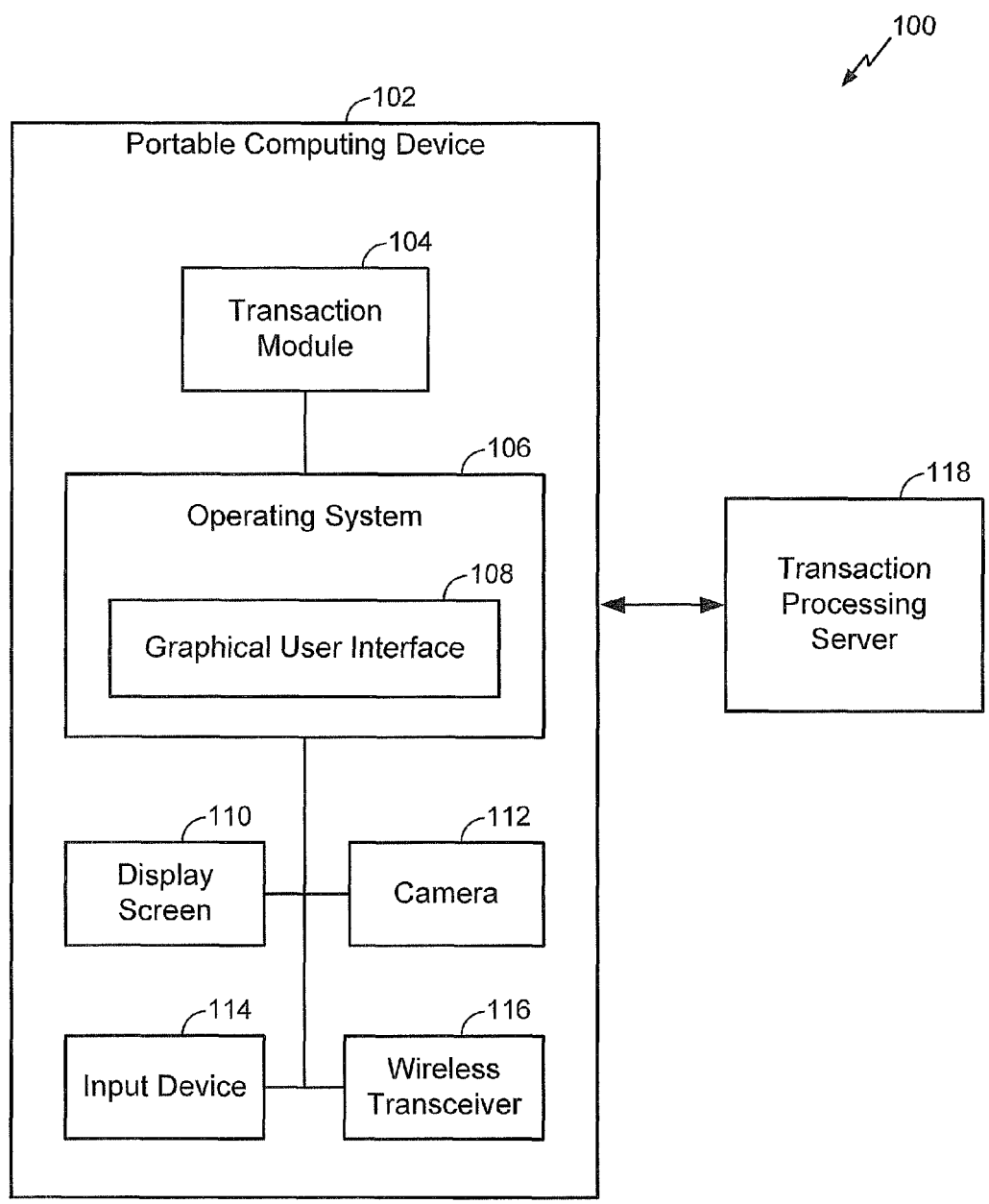
FIG. 1 is a block diagram illustrating a portable computing device that may utilize or be utilized by the various implementations disclosed herein.

FIG. 1 is a block diagram illustrating a portable computing device 100 that may utilize (or be utilized by) the various implementation disclosed herein. As shown in FIG. 1, the system includes a portable computing device 102 and a transaction processing server 118. The portable computing device 102, as well as the transaction processing server 118, may be implemented using a general purpose computing device such as the computing device 700 described with respect to FIG. 7, for example.

More particularly, portable computing device 102 may correspond to a portable electronic device that provides one or more services or functions to a user. For example, portable computing device 102 may operate as a mobile phone, portable computer, global positioning system (GPS receiver), portable media player, and/or graphing calculator. In addition, portable computing device 102 may include an operating system 106 that coordinates the use of hardware and software resources on portable computing device 102, as well as one or more applications (e.g., transaction module 104) that perform specialized tasks for the user. For example, portable computing device 102 may include applications such as an email client, an address book, a document editor, and/or a media player. To perform tasks for the user, applications may obtain access to hardware resources (e.g., processor, memory, I/O components, etc.) on portable computing device 102 from the operating system 106.

Applications may also interact with the user through a hardware and/or software framework provided by operating system 106. To enable interaction with the user, portable computing device 102 may include one or more hardware input/output (I/O) components, such as display screen 110, camera 112, input device 114, and wireless transceiver 116. Each hardware I/O component may additionally be associated with a software driver (not shown) that allows operating system 106 and/or applications on portable computing device 102 to access and use the hardware I/O components.

Display screen 110 may be used to display images and/or text to one or more users of portable computing device 102. In one or more implementations, display screen 110 serves as the primary hardware output component for portable computing device 102. For example, display screen 110 may allow the user(s) to view menus, icons, windows, emails, websites, videos, pictures, maps, documents, and/or other components of a graphical user interface (GUI) 108 provided by operating system 106. Those skilled in the art will appreciate that display screen 110 may incorporate various types of display technology to render and display images. For example, display screen 110 may be a liquid crystal display (LCD), an organic light-emitting diode (OLED) display, a surface-conducting electron-emitter display (SED), and/or other type of electronic display.

Input device 114 may function as the primary hardware input component of portable computing device 102. Specifically, input device 114 may allow the user to point to and/or select one or more areas of display screen 110 using a cursor, highlight, and/or other visual indicator. Input provided by the user using input device 114 may be processed by the corresponding software driver and sent to operating system 106 and/or one or more applications (e.g., transaction module 104) as one or more actions. Input device 114 may receive user input through various methods, including touchscreens, touchpads, buttons, voice recognition, keypads, keyboards, and/or other input methods.

In addition, multiple input devices may exist on portable computing device 102. Operating system 106 and/or applications on portable computing device 102 may use the input from the input device(s) to perform one or more tasks, as well as update GUI 108 in response. Images corresponding to GUI 108 may be sent by operating system 106 to a screen driver (not shown), which may display the images on display screen 110 as a series of pixels. As a result, the user may interact with portable computing device 102 by using input device 114 to provide input to operating system 106 and/or applications and receiving output from operating system 106 and/or applications through display screen 110.

Camera 112 may allow the user to capture images using portable computing device 102, including images of an embossed form factor such as a credit card, debit card, gift card, reward card, or other stored value card, as well as other embossed form factors. For example, camera 112 may correspond to a mobile phone camera or a webcam on a laptop computer. Camera 112 may also record still and/or video images using a lens and digital image sensor. The images recorded by camera 112 may additionally be stored in a file system (not shown) of portable computing device 102 and used by one or more applications (e.g., transaction module 104). In one or more implementations, images taken by camera 112 are used for processing information embossed on a form factor such as a credit card, as further explained later herein.

The digital camera 112 already present (i.e., "built-in") in portable computing device 102 may be used to capture an image of a form factor with embossed characters for purposes of completing a transaction. Existing optical character recognition (OCR) based approaches (which generally utilize "blob detection" methodologies) have been largely unsuccessful at reading credit card information because credit card information is embossed directly onto the face of the credit card, and detecting embossed characters has proven very challenging because an accurate reading of the embossed characters is very sensitive to illumination, uneven color characteristics (particularly in view of wear-and-tear of the embossed characters over time), and the complex background images on the credit cards that often obscure the information from OCR detection. As further described herein, an embossed character reading solution enables portable computing devices to more effectively and accurately read embossed information using the device's built-in digital camera.

Wireless transceiver 116 may allow portable computing device 102 to connect to one or more wireless networks, such as wireless local area networks (LANs) and/or portable computing devices networks. Portable computing device 102 may also communicate with one or more locations on the network(s) by sending and/or receiving data over the network(s) using wireless transceiver 116. For example, portable computing device 102 may use wireless transceiver 116 to retrieve web pages, make calls, download and upload files, and send and receive emails over the network(s). (Alternately, a wired connection might instead be used for a non-portable device for certain alternative implementations.)

In an implementation, portable computing device 102 includes functionality to process transactions such as financial transactions. Specifically, portable computing device 102 may include functionality—such as transaction module 104—to process transactions such as credit card transactions (e.g., alone or in conjunction with a transaction processing server 118). In addition, various hardware and software components within portable computing device 102 may be used to establish and process card-present credit card transactions. Consequently, portable computing device 102 may be used to perform credit card transactions without additional equipment or the cost of non-card-present fees.

As shown in FIG. 1, portable computing device 102 includes a transaction module 104. In an implementation, transaction module 104 obtains transaction data associated with a financial transaction and enables the financial transaction to be processed using the transaction data. In an implementation, the transaction data includes credit card information from a credit card that may include a credit card number, an expiration date, a verification number, and so forth. To establish a card-present transaction and determine the information present on a credit card, transaction module 104 may obtain one or more images of the credit card which may be physically presented for photographing upon initiation of the transaction. The image(s) of the form factor, such as the credit card, are captured by camera 112 and processed by transaction module 104. For certain implementations, the image(s) may also include a front image of the embossed form factor and/or a back image of the embossed form factor.

For several implementations, some or all of the embossed form factor information may be obtained automatically from the front image and/or back image of the form factor—that is, information may be obtained in whole or in part by performing enhanced OCR on the image(s) of the credit card. For certain implementations, the embossed form factor information might be manually entered by a user such that transaction module 104 may then compare the manually entered information with the information extracted by the enhanced OCR to verify its accuracy. The results of the comparison may be reported to the user before the transaction is processed. Once processed, the embossed form factor information may be sent by the transaction module 104 to the transaction processing server 118 using wireless transceiver 116.

Transaction processing server 118 is an entity that is able to facilitate a transaction or other action/event in response to information obtained from an embossed form factor. For example, if the embossed form factor is a credit card, debit card, or other stored value card, then the transaction processing server 118 would be part of a transaction clearinghouse maintained and operated by the card issuer to facilitate the desired transaction.

Figure 2:
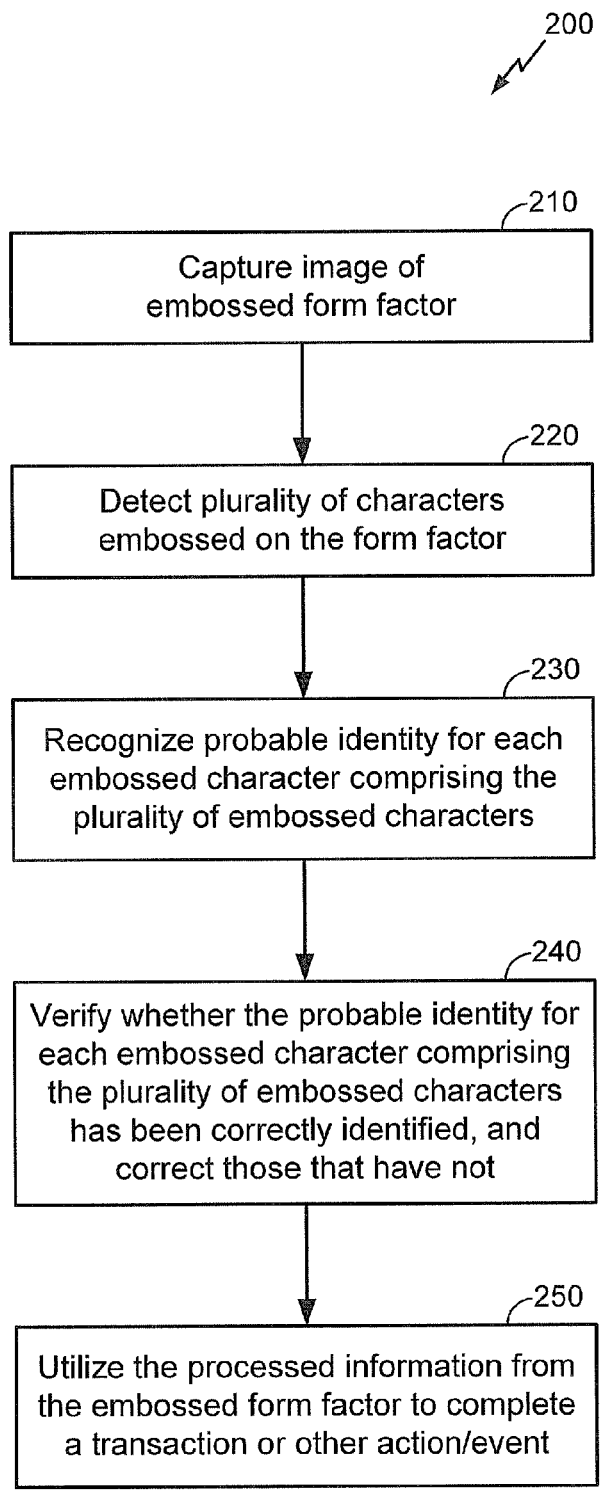
FIG. 2 is an operational flow illustrating the processing of images of embossed form factors captured by a digital camera of a portable computing device representative of several implementations disclosed herein.

FIG. 2 is an operational flow of a method 200 illustrating the processing of images of embossed form factors captured by a digital camera of a portable computing device representative of several implementations disclosed herein.

As shown in FIG. 2, after an image is captured at 210, processing of the image commences at 220 with detecting each of the individual embossed characters from the form factor image. At 230, these individual characters then undergo a recognition process to ascertain the probable identity of each specific embossed character.

At 240, the probable identities for each embossed character is verified (to ensure that the recognized characters have been correctly identified) and corrected if necessary (e.g., if the identification confidence is below a predetermined threshold, such as a threshold set by a user or an administrator). At 250, the information derived from the detection, recognition, and verification/correction phases may be utilized to complete a transaction or other action/event.

For certain implementations that process embossed form factors having consistent characteristics—such as credit cards, for example—the detection, recognition, and verification/correction processing phases may use one or more of the following characteristics of such form factors: (a) the use of a fixed font and size, (b) conformance to certain numbering conventions for checksum calculations, and (c) common sense constraints on certain values (such as for the month in the expiration date).

For example, detection of credit cards may be performed by determining the known regions of the account number and expiration date embossed on the face of the credit card, as well as the known structure of the account number and the expiration date for each specific type of credit card. For example, the account number for Visa and MasterCard credit cards has four clusters of four digits each (i.e., "#### ####

####"), while an American Express credit card has three clusters of four, six, and five digits, respectively (i.e., "#### ###### #####"). Moreover, the expiration date is four digits corresponding to a two-digit month and a two-digit year separated by a slash character (i.e., "##/##"). Gradient and edge images with a mask (that consists of connected edge pixels over the predefined size of the embossed characters) may be used to determine robustness characteristics corresponding to the regions for the account number and expiration date. More specifically, to detect the region of an embossed digit (or character), certain implementations may utilize the well-known "sliding window technique" where a "target" is derived from the logical combination of edge, gradient, and mask, that is, the connected edge pixels which are bigger than the predefined size of embossed characters that are generally processed separately for horizontal and vertical edge pixels. (Note: As used herein, "digits" is a subset of "characters" although these terms may be used interchangeably such that where "digits" is used "characters" is implied and where "characters" is used "digits" is included among such "characters.")

Once the account number and expiration date are detected, recognition may be performed for each detected character to determine the probable identity of each character. This recognition may be based on the concatenated histogram of oriented gradients (HOG) to compare each detected digit with templates of digits to find likely matches. As known by skilled artisans, HOG comprises feature descriptors used in computer vision and image processing for the purpose of object detection. The HOG technique counts occurrences of gradient orientation in localized portions of an image. This is similar to the approach of edge orientation histograms, scale-invariant feature transform descriptors, and shape contexts, but HOG differs in that it is computed on a dense grid of uniformly spaced cells and uses overlapping local contrast normalization for improved accuracy.

Figure 3:
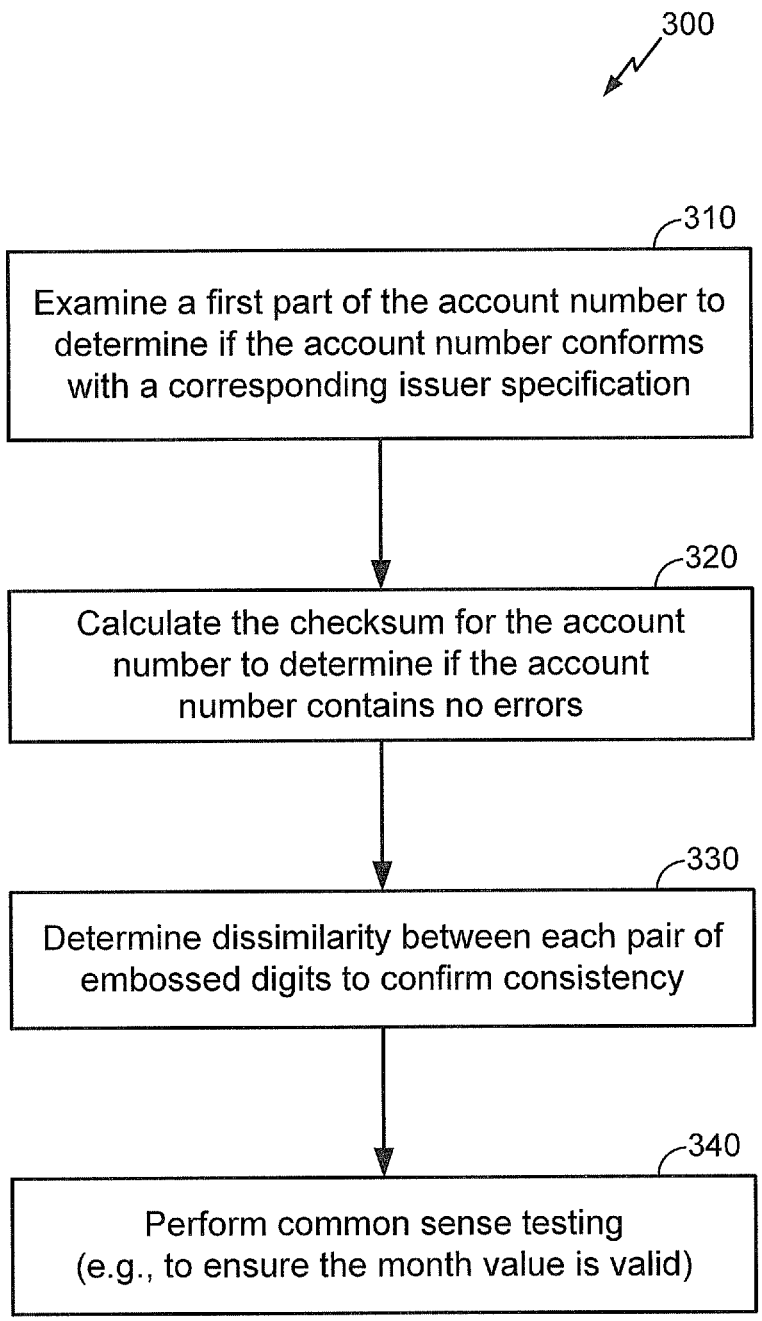
FIG. 3 is an operational flow illustrating verification tasks representative of several implementations disclosed herein.

For credit cards in particular, and after the characters are recognized, the probable identity of each character can be verified to ensure accuracy and corrected if necessary. FIG. 3 is an operational flow of a method 300 illustrating verification tasks representative of several implementations disclosed herein. As shown in FIG. 3, embossed form factor (e.g., credit card) verification may comprise up to four tasks and may be performed in any order with the specific composition and order shown in FIG. 3 being merely an exemplary subset of all possible implementations.

The first validation task, at 310, is an examination of the first part of the account number to ensure it conforms with issuer specification. For example, Visa account numbers begin with a four ("4"), MasterCard account numbers begin with a five ("5") and have a second digit between one and five (i.e., "1", "2", "3", "4", or "5"), and American Express account numbers begin with a three ("3") and have a second digit that is either a four ("4") or a seven ("7").

The second validation task, at 320, is to calculate the checksum for each account number using the well-known Luhn algorithm (a.k.a., the "mod 10 algorithm"), for example, although any known checksumming technique may be used.

At 330, the third validation task is to determine dissimilarity between each pair of embossed digits to confirm that the dissimilarity is low when digits are the same and dissimilarity is high when the digits are not the same.

At 340, the fourth validation task is "common sense testing" to ensure, for example, that (a) the first digit of the month for the expiration date is a zero ("0") or a one ("1") since no other values are possible for a valid month indicator and (b) that if the first digit is a one, then the second digit is a zero, one, or two where, again, no other values are possible for a valid month indicator. Stated differently, measuring dissimilarity between two embossed digits utilizes the probability that the two digits are the same and, in this context, the probability is estimated from pre-calculated dissimilarities such that if the probability that the two digits are the same is relatively high the candidates of the two digits become the same value, and if the probability that the two digits are the same is relatively low the candidates of the two digits become different values. For certain implementations, the calculation of dissimilarity between each pair of embossed digits (or characters) may utilize and/or be based on the concatenated histogram of oriented gradients (HOG) used to compare every pair of embossed digits.

To correct for any characters that fail the validation tests, various approaches may be employed to determine the possible correct values for the character. From the possible correct values, a further determination may be made as to which is the likely correct value in view of the processes previously described. In some instances, for example, only one possible value for a character will be valid for the checksum in view of the other characters already included in the checksum. Likewise, if the credit card is detected to be a Visa credit card, then correcting the first character of the account number is straightforward. Finally, even if more than one value is possible for a specific character, the techniques previously described for detection and recognition could be used to find the most probable character from among the restricted set. Correction can lead to the repeat and reapplication of any of the previously performed phases and tasks as appropriate and desired until a high-confidence solution for the credit card data is derived.

Figure 4:
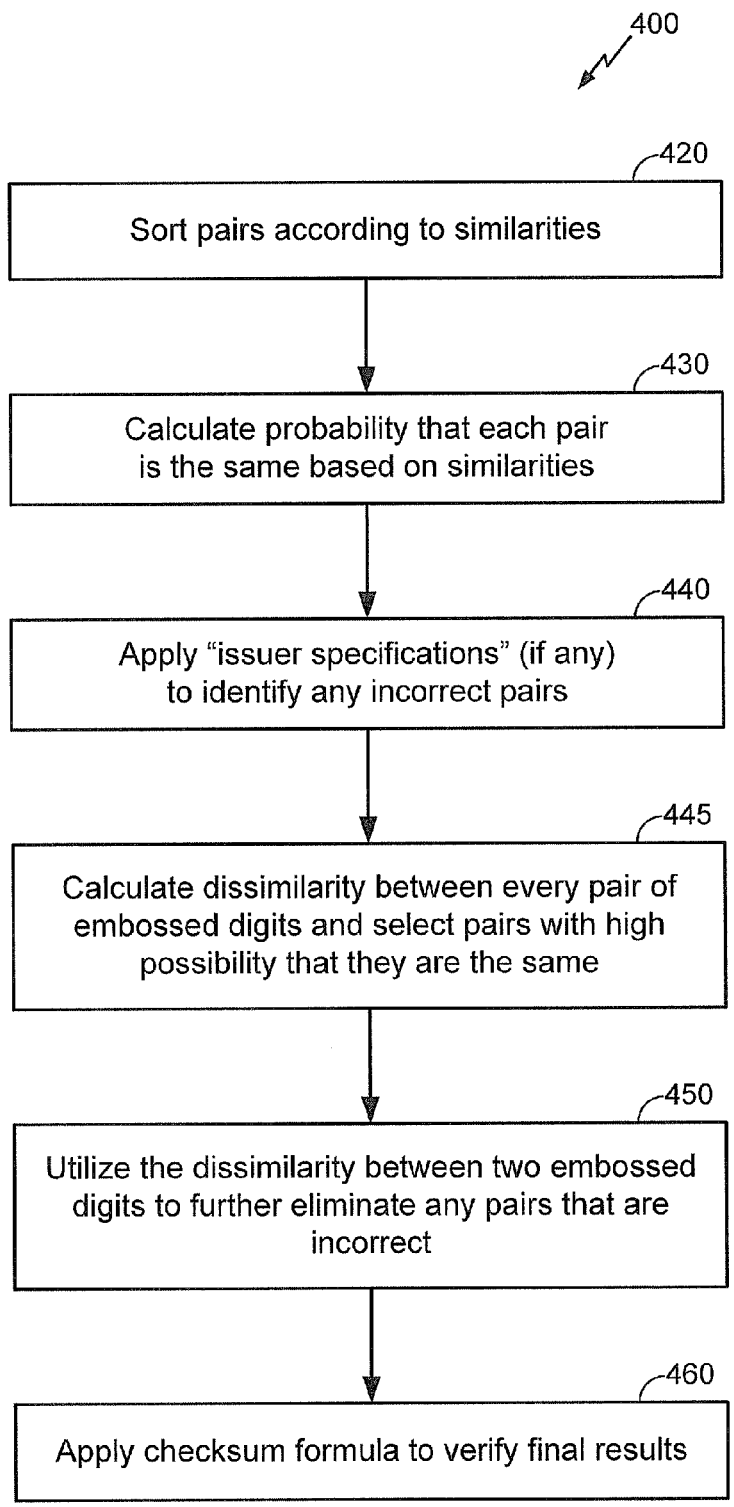
FIG. 4 is an operational flow illustrating a verification process for embossed form factors representative of several implementations disclosed herein.

FIG. 4 is an operational flow of a method 400 illustrating a verification process for embossed form factors (such as credit cards but also applicable to any other embossed form factors) representative of several implementations disclosed herein.

As shown in FIG. 4, this "dissimilarity" verification process commences at 420 where the candidate pairs are sorted according to their degree of similarity and, at 430, a probability of being the same is calculated for each pair based on the degree of similarity. (Note: "similarity" is used in the context of comparing embossed digits/characters with templates, whereas "dissimilarity" is used in the context of comparing only embossed digits/characters to each other.)

At 440, the process then applies any constraints or guidance from the "issuer specifications" (if any) to identify any incorrect pairs. At 445, the process continues by calculating or otherwise determining the dissimilarity between every pair of embossed digits, and then selecting those pairs having the highest probability of being the same, and at 450 the dissimilarity between two embossed digits is used to further eliminate any pairs that are incorrect.

At 460, a checksum is applied to verify the final results. For select implementations, the process of FIG. 4 may be utilized to verify the account information of a credit card.

Figure 5:
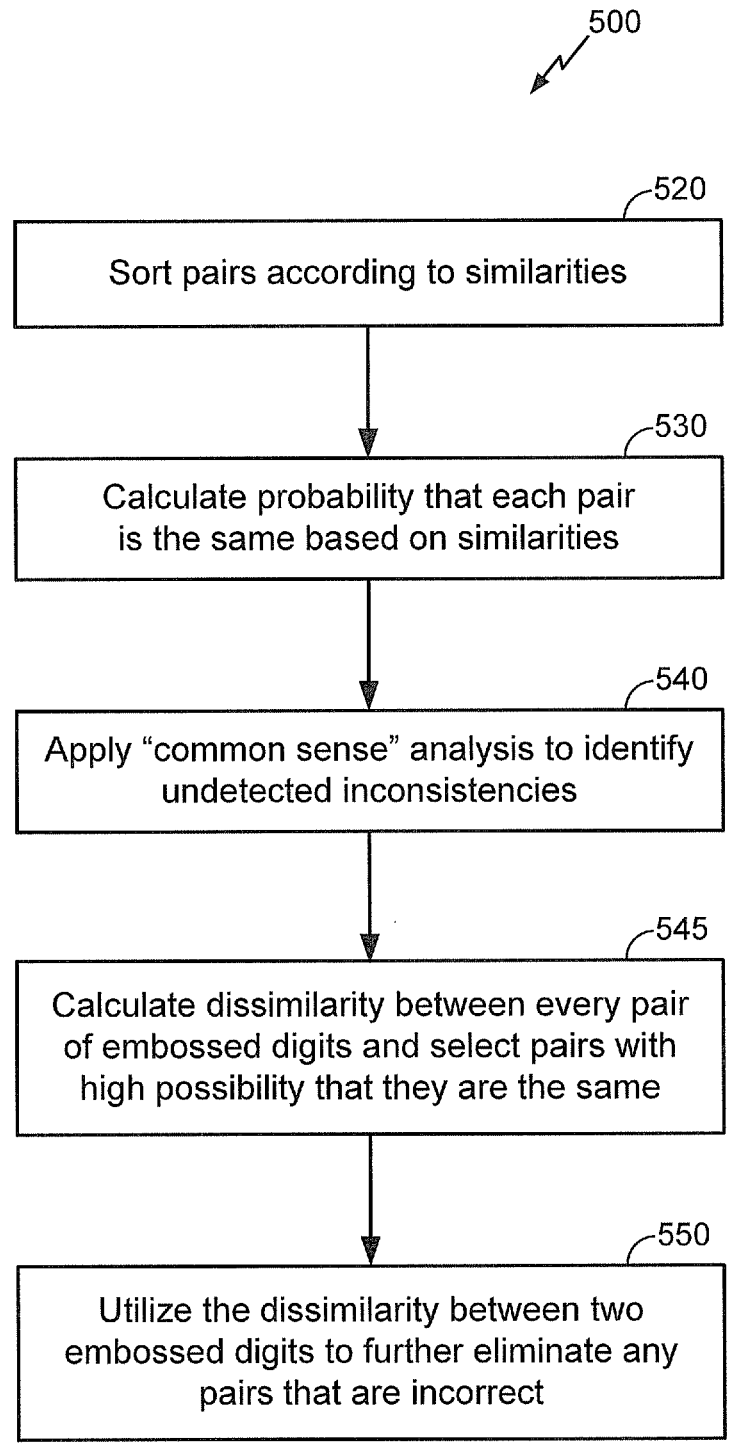
FIG. 5 is an operational flow illustrating another verification process for embossed form factors representative of several implementations disclosed herein.

FIG. 5 is an operational flow of a method 500 illustrating another verification process. The verification process commences at 520 where candidate pairs are sorted according to their degree of similarity and, at 530, a probability of being the same is calculated for each pair based on the degree of similarity.

At 540, the process then applies a "common sense" analysis (such as the one described earlier herein for credit cards) in order to identify any incorrect pairs, and at 545 the process continues by calculating or otherwise determining the dissimilarity between every pair of embossed digits, and then selecting those pairs having the highest probability of being the same. At 550, the dissimilarity between two embossed digits is used to identify and eliminate any pairs that are incorrect. For select implementations, the process of FIG. 5 may be utilized to verify the expiration date of a credit card.

It should be noted that the processes of FIGS. 4 and 5 can be used in parallel to determine the account information and the expiration date, respectively, for a credit card, for example.

Figure 6:
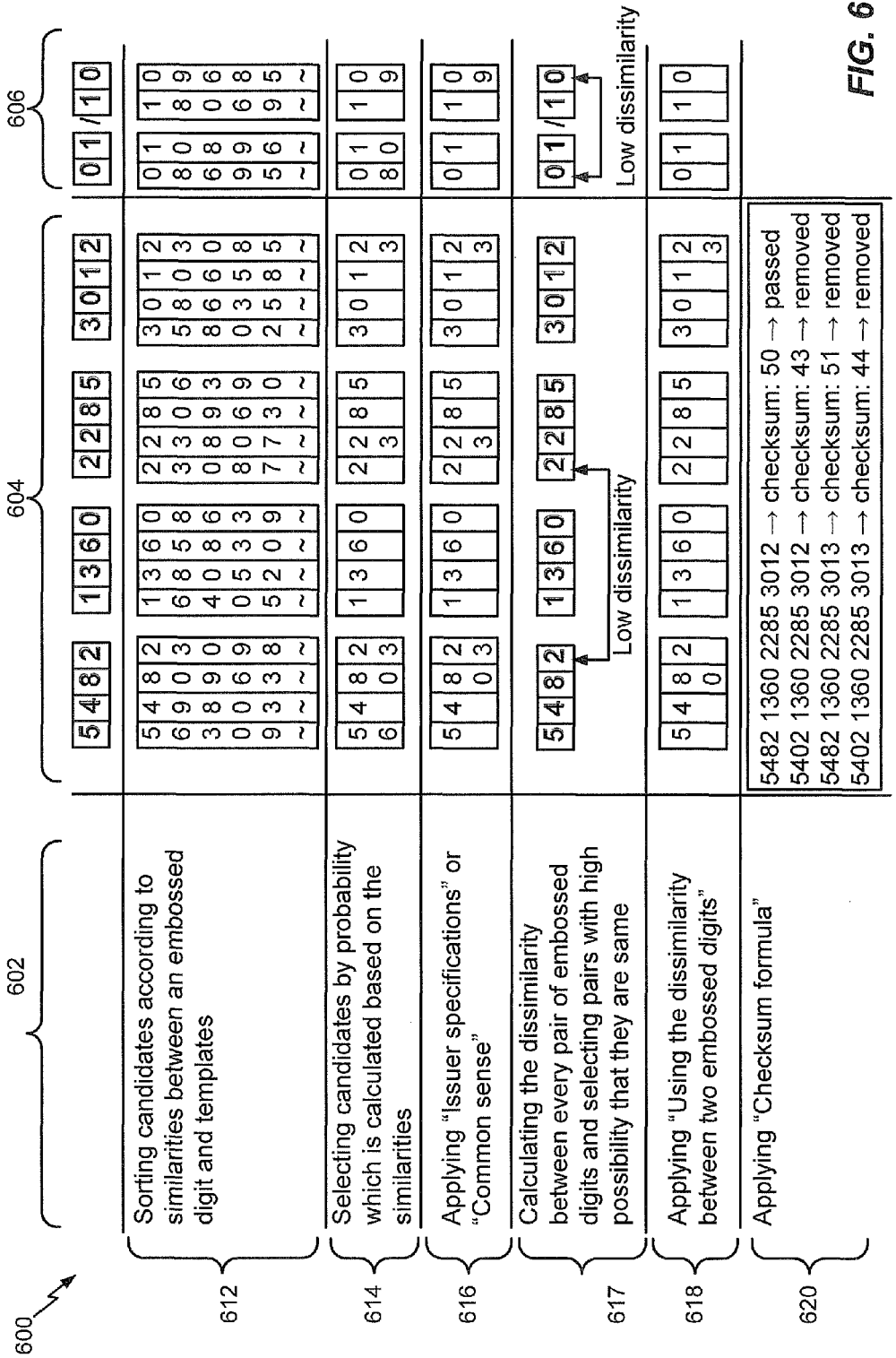
FIG. 6 is a processing state table illustrating the processes of FIGS. 4 and 5 applied to a credit card (as the embossed form factor) representative of several implementations disclosed herein.

FIG. 6 is a processing state table 600 illustrating the processes of FIGS. 4 and 5 applied to a credit card (as the embossed form factor) representative of several implementations disclosed herein. As shown in FIG. 6, the embossed characters of a credit card, for example (comprising the account number and the expiration date), are progressively processed using the tasks set forth in FIGS. 4 and 5 to determine the possible correct information recognized from an image of the credit card, winnowing down the possibilities until only a few remain and, for the account number, a checksum is then applied to determine which account number is the correctly determined account number.

More specifically, the elements of FIGS. 4 and 5 reiterated in column 602 act upon the credit card account number (column 604) and expiration date (column 606) accordingly such that, at row 612, these high-possibility pairs are sorted according to similarity as shown. At row 614, the high-possibility pairs (or "candidates") are selected based on their probability of being accurate based on the determined similarity. At row 616, "issuer specifications" and/or "common sense" are applied to eliminate combinations that cannot be accurate, and at row 617 the dissimilarity between every pair of embossed digits of the credit card (or other embossed form factor) is calculated so that pairs with high possibility of being the same may be selected. At row 618, the dissimilarity between embossed digits may be used to further eliminate potential candidates and leave only the final candidate(s) with the highest probabilities of being correct. For the account number of column 604, these final candidate(s) are then processed with a checksum formula at row 620 to determine which of the final candidates is correct and which are incorrect.

Figure 7:
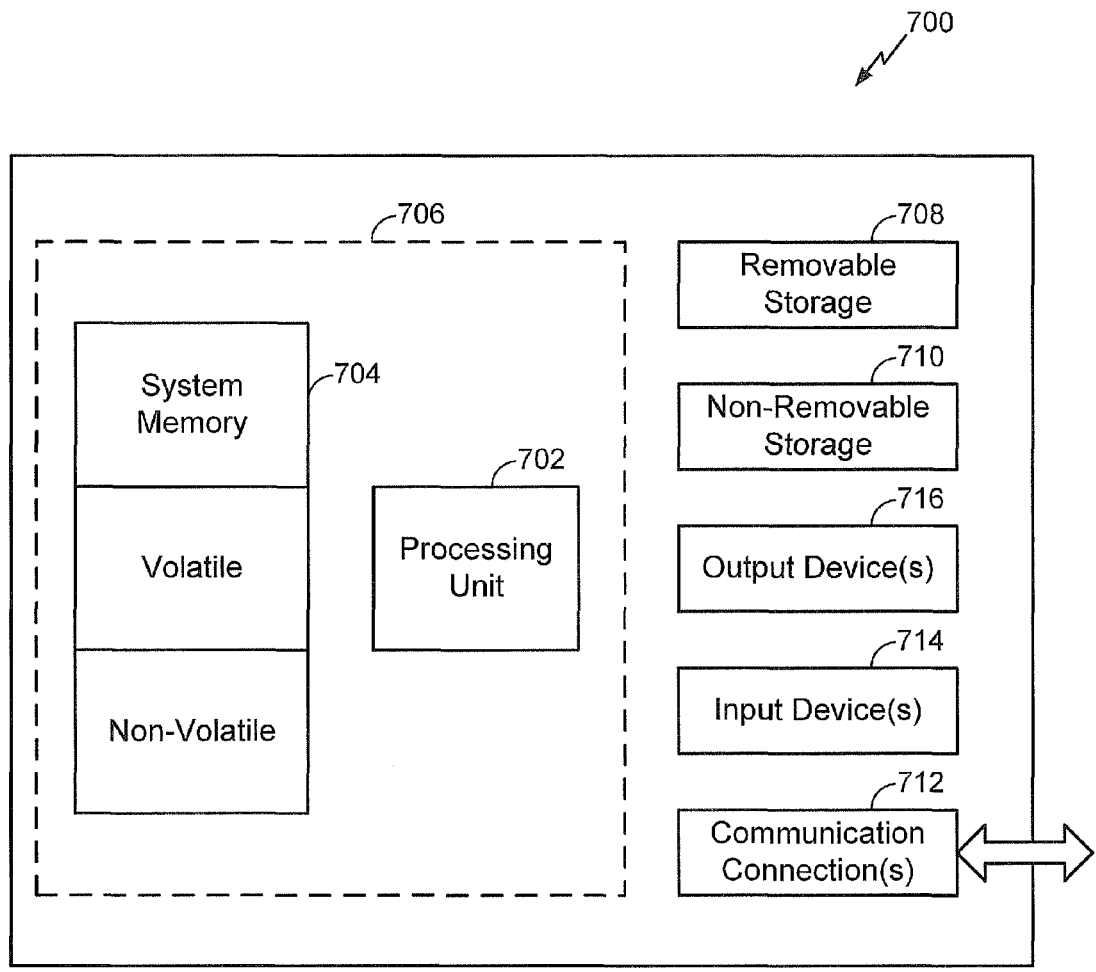
FIG. 7 shows an exemplary computing environment in which example implementations and aspects may be implemented.

FIG. 7 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for a portable computing device to read information embossed on a form factor utilizing a built-in digital camera, the method comprising:
   capturing an image of the form factor having information embossed thereupon;
   detecting a plurality of embossed characters, wherein the detecting utilizes a gradient image and one or more edge images with a mask corresponding to regions for which specific information is expected to be found on the form factor;
   performing a comparison of a pair of the embossed characters; and
   determining dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters.

2. The method of claim 1, further comprising determining a probable identity for each embossed character.

3. The method of claim 2, wherein, prior to performing the comparison of the pair of the embossed characters, the embossed characters are compared with a set of templates of embossed characters and occurrences of gradient orientation in localized portions of the image are counted.

4. The method of claim 2, further comprising verifying whether the probable identity for each embossed character has been correctly identified.

5. The method of claim 4, further comprising correcting the probable identity of at least one of the embossed characters that has not been correctly identified.

6. The method of claim 1, wherein the mask comprises a plurality of connected edge pixels over a predefined size for an embossed character set for a credit card.

7. The method of claim 1:
   wherein the form factor is a credit card,
   wherein the image comprises an account number and an expiration date embossed upon the credit card,
   wherein the regions correspond to the account number and the expiration date of the credit card, and
   wherein the account number and the expiration date of the credit card are detected.

8. The method of claim 7, further comprising:
   determining a probable identity for each embossed character;
   verifying whether the probable identity for each embossed character has been correctly identified; and
   correcting the probable identity of at least one of the embossed characters that has not been correctly identified.

9. The method of claim 8, wherein the verifying comprises examining a first part of the account number to determine if the account number conforms with a corresponding issuer specification.

10. The method of claim 8, further comprising calculating a checksum for the account number to determine if the account number contains an error.

11. The method of claim 8, further comprising performing common sense testing of the expiration date.

12. A method for a portable computing device utilizing a built-in digital camera to read information from an embossed form factor, the method comprising:
capturing an image of the embossed form factor;
detecting embossed characters;
performing a comparison of a pair of the embossed characters; and
determining dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters.

13. The method of claim 12, wherein the detecting utilizes a gradient image and one or more edge images with a mask corresponding to regions of the embossed characters.

14. The method of claim 13, further comprising determining a probable identity for each embossed character.

15. The method of claim 14, further comprising verifying whether the probable identity for each embossed character has been correctly identified.

16. The method of claim 15, further comprising correcting the probable identity of at least one of the embossed characters that has not been correctly identified.

17. The method of claim 15, wherein the embossed form factor is a credit card comprising account information and expiration date information.

18. The method of claim 17, further comprising examining a first part of the account information to determine if the account information conforms with a corresponding issuer specification.

19. The method of claim 17, further comprising calculating a checksum for the account information to determine if the account information contains an error.

20. The method of claim 17, further comprising performing common sense testing of an expiration date.

21. The method of claim 17, wherein the mask comprises a plurality of connected edge pixels over a predefined size for an embossed character set for the credit card.

22. The method of claim 17, wherein each of the embossed characters is compared with a set of templates of embossed characters and occurrences of gradient orientation in localized portions of the image are counted.

23. A device capable of reading information embossed on a form factor utilizing a built-in digital camera, the device comprising:
a camera configured to capture an image of the form factor having information embossed thereupon; and
a transaction module configured to detect embossed characters and further configured to perform a comparison of a pair of the embossed characters and to determine dissimilarity between the pair of the embossed characters based on the comparison, wherein the detecting utilizes a gradient image and one or more edge images with a mask corresponding to regions for which specific information is expected to be found on the form factor, and wherein determining the dissimilarity includes estimating a probability that characters of the pair of the embossed characters are not the same based on a concatenated histogram of oriented gradients (HOG) corresponding to the pair of the embossed characters.

24. The device of claim 23, wherein the transaction module is further configured to determine a probable identity for each embossed character.

25. The device of claim 24, wherein the transaction module is further configured to compare each embossed character with a set of templates of embossed characters and to count occurrences of gradient orientation in localized portions of the image.

26. The device of claim 24, wherein the transaction module is further configured to verify whether the probable identity for each of the embossed characters has been correctly identified.

27. The device of claim 26, wherein the transaction module is further configured to correct the probable identity of at least one of the embossed characters that has not been correctly identified.

28. The device of claim 23, wherein the mask comprises a plurality of connected edge pixels over a predefined size for an embossed character set for a credit card.

29. The device of claim 23, configurable to process a credit card as the form factor:
wherein the image comprises an account number and an expiration date embossed upon the form factor,
wherein the regions correspond to the account number and the expiration date of the credit card, and
wherein the account number and the expiration date of the credit card are detected.

30. The device of claim 29, wherein the transaction module is further configured to:
determine a probable identity for each of the embossed characters;
verify whether the probable identity for each of the embossed characters has been correctly identified; and
correct the probable identity of at least one of the embossed characters that has not been correctly identified.

31. The device of claim 30, wherein the verifying comprises examining a first part of the account number to determine if the account number conforms with a corresponding issuer specification.

32. The device of claim 30, wherein the transaction module is further configured to calculate a checksum for the account number to determine if the account number contains an error.

33. A portable computing device configured to utilize a built-in digital camera to read information from an embossed form factor, the device comprising:
a camera configured to capture an image of the embossed form factor; and
a transaction module configured to detect embossed characters and further configured to perform a comparison of a pair of the embossed characters and to determine dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters.

34. The portable computing device of claim 33, wherein the transaction module is further configured to utilize a gradient image and one or more edge images with a mask corresponding to regions of the embossed characters.

35. The portable computing device of claim 34, wherein the transaction module is further configured to determine a probable identity for each of the embossed characters.

36. The portable computing device of claim 35, wherein the transaction module is further configured to verify whether the probable identity for each of the embossed characters has been correctly identified.

37. The portable computing device of claim 36, wherein the transaction module is further configured to correct the probable identity of at least one of the embossed characters that has not been correctly identified.

38. The portable computing device of claim 36, configured to process a credit card comprising account information and expiration date information as the embossed form factor.

39. The portable computing device of claim 38, wherein the transaction module is further configured to examine a first part of the account information to determine if the account information conforms with a corresponding issuer specification.

40. The portable computing device of claim 38, wherein the transaction module is further configured to calculate a checksum for the account information to determine if the account information contains an error.

41. The portable computing device of claim 38, wherein the transaction module is further configured to apply common sense testing to an expiration date.

42. The portable computing device of claim 38, wherein the mask comprises a plurality of connected edge pixels over a predefined size for an embossed character set for a credit card.

43. The portable computing device of claim 38, wherein the transaction module is further configured to compare each of the embossed characters with a set of templates of embossed characters and to count occurrences of gradient orientation in localized portions of an image.

44. A system for reading information embossed on a form factor, the system comprising:
means for capturing an image of the form factor having information embossed thereupon; and
means for processing the image, wherein the means for processing the image is configured to:
detect embossed characters utilizing a gradient image and one or more edge images with a mask corresponding to regions for which specific information is expected to be found on the form factor;
perform a comparison of a pair of the embossed characters; and
determine dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters.

45. The system of claim 44:
wherein the form factor is a credit card,
wherein the image comprises an account number and an expiration date embossed upon the credit card,
wherein the regions correspond to the account number and the expiration date of the credit card, and
wherein the means for processing the image is configured to detect the account number and the expiration date of the credit card.

46. The system of claim 45, wherein the means for processing the image is further configured to:
determine a probable identity for each of the embossed characters;
verify whether the probable identity for each of the embossed characters has been correctly identified; and
correct the probable identity of each of the embossed characters that has not been correctly identified.

47. A system for reading information from an embossed form factor, the system comprising:
means for capturing an image of the embossed form factor;
means for processing the image, wherein the means for processing the image is configured to:
detect embossed characters;
perform a comparison of a pair of the embossed characters; and
determine dissimilarity between the pair of the embossed characters based on the comparison;
wherein the means for processing the image utilizes a gradient image and one or more edge images with a mask corresponding to regions of the embossed characters, and wherein determining the dissimilarity includes estimating a probability that characters of the pair of the embossed characters are not the same based on a concatenated histogram of oriented gradients (HOG) corresponding to the pair of the embossed characters.

48. The system of claim 47, wherein the means for processing the image is further configured to:
determine a probable identity for each of the embossed characters; and
verify whether the probable identity for each of the embossed characters has been correctly identified.

49. The system of claim 48, wherein the embossed form factor is a credit card comprising account information and expiration date information.

50. The system of claim 49, wherein the means for processing the image is configured to compare each of the embossed characters with a set of templates of embossed characters and to count occurrences of gradient orientation in localized portions of the image.

51. A computer program product including a non-transitory computer readable medium storing instructions which, when executed by a processor, cause the processor to:
capture an image of a form factor having information embossed thereupon;
detect embossed characters, wherein the detecting utilizes a gradient image and one or more edge images;
perform a comparison of a pair of the embossed characters; and
determine dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters.

52. The computer program product of claim 51, further comprising instructions which, when executed by a processor, cause the processor to:
determine a probable identity for each of the embossed characters;
verify whether the probable identity for each of the embossed characters has been correctly identified; and
correct the probable identity of each of the embossed characters that has not been correctly identified;
wherein the detecting utilizes a mask corresponding to regions for which specific information is expected to be found on the form factor.

53. A computer program product including a non-transitory computer readable medium storing instructions which, when executed by a processor, cause the processor to:
- capture an image of an embossed form factor;
- detect embossed characters;
- perform a comparison of a pair of the embossed characters; and
- determine dissimilarity between the pair of the embossed characters based on the comparison, wherein determining the dissimilarity includes estimating a probability that characters of the pair of the embossed characters are not the same based on a concatenated histogram of oriented gradients (HOG) corresponding to the pair of the embossed characters;
- wherein the detecting utilizes a gradient image and one or more edge images with a mask corresponding to regions of the embossed characters.

54. The computer program product of claim 53, further comprising instructions which, when executed by a processor, cause the processor to:
- determine a probable identity for each of the embossed characters; and
- verify whether the probable identity for each of the embossed characters has been correctly identified;
- wherein the embossed form factor is a credit card comprising account and expiration date information, wherein the mask corresponds to regions of the account and expiration date information, and wherein each of the embossed characters is compared with a set of templates of embossed characters and occurrences of gradient orientation in localized portions of the image are counted.

* * * * *